United States Patent Office 3,544,651
Patented Dec. 1, 1970

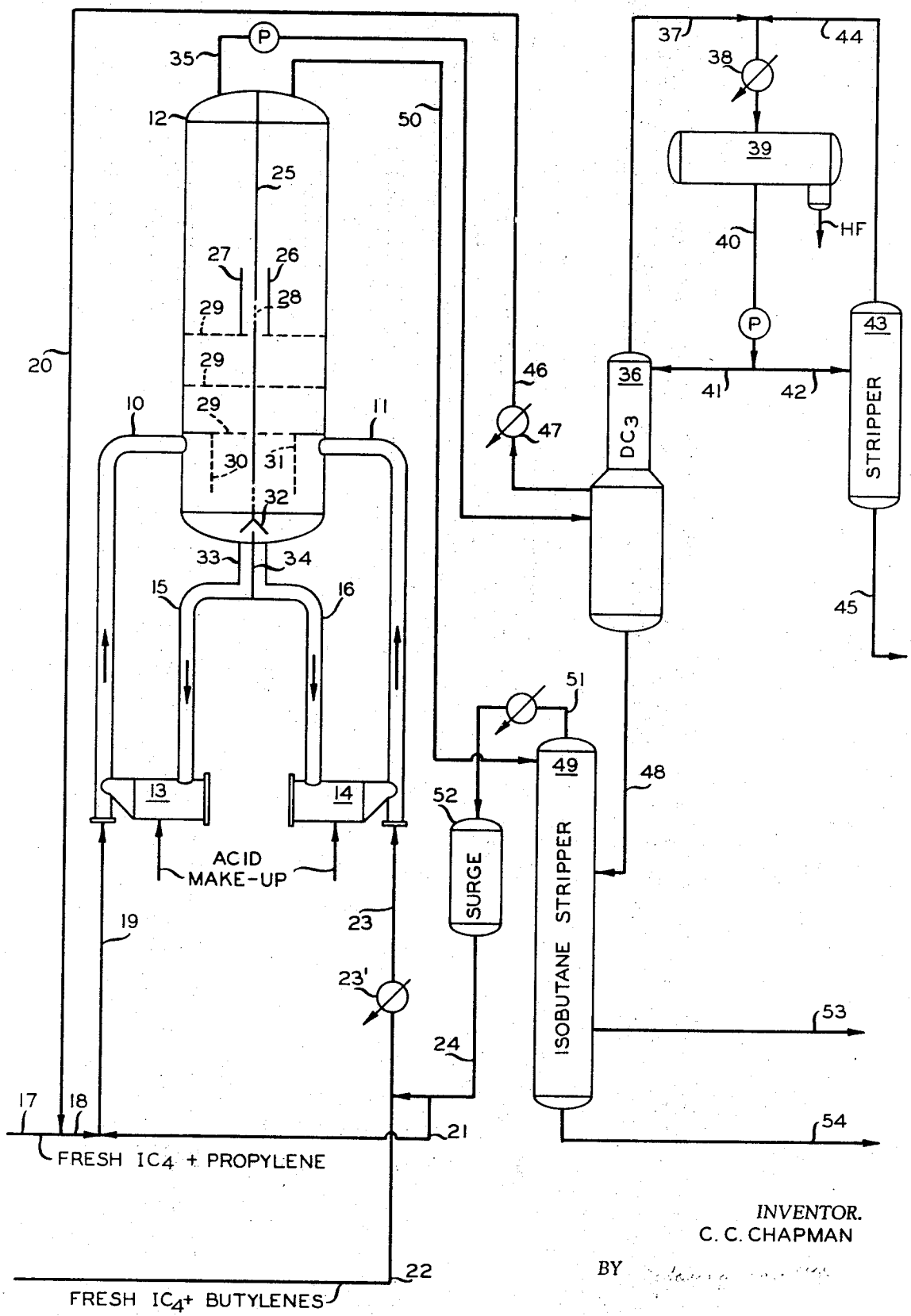

3,544,651
RECYCLING ACID STREAMS TO DIFFERENT ALKYLATION REACTIONS
Charles C. Chapman, Bartlesville, Okla., assignor to Phillips Petroleum Company, a corporation of Delaware
Filed May 2, 1968, Ser. No. 726,102
Int. Cl. C07c 3/54
U.S. Cl. 260—683.45                                3 Claims

ABSTRACT OF THE DISCLOSURE

Separate acid catalytic alkylations are maintained wherein isoparaffin is reacted with a different olefin in each alkylation reaction, the resulting alkylate-acid admixtures are maintained separately in a liquid-full divided settler and the acid catalyst removed from each part of the divided settler is partially mixed but recycled separately to the respective alkylation reactions. The partial mixing of the acid catalyst provides acid streams which are more nearly at the temperatures of the respective alkylation reactions.

BACKGROUND OF THE INVENTION

This invention relates to a process and apparatus for the alkylation of isoparaffins with two or more different olefins with a liquid acid alkylation catalyst. In accordance with another aspect, this invention relates to an alkylate-acid separator provided with a baffle dividing the separator into two chambers, which baffle extends from wall to wall but is spaced from the bottom wall only to allow partial mixing of acid being withdrawn and returned by way of separate conduits to the respective alkylators. In accordance with a further aspect, the baffle provided in the divided separator has apertures at an intermediate point and two short vertical plates on each side of the apertures to form an equalizing well between the two liquid-full chambers within the separator containing the different alkylates and the baffle is further provided at its lower extremity with a vortex breaker in the form of an inverted cone. In accordance with a further aspect, the acid outlet connected to the two chambers of the alkylate-acid separator is divided by a plate beneath the vortex breaker so as to divide the acid catalyst and return for the most part the catalyst used in the respective alkylators, thereby providing a heat exchange advantage over other systems.

The alkylation of an isoparaffin with one or more olefins in a single alkylation zone is conventional in the art. Various types of catalysts have been utilized in this reaction, including sulfuric acid, hydrochloric acid, phosphoric acid, certain halo sulfonic acids, and aluminum chloride. The preferred catalyst is substantially anhydrous hydrofluoric acid because of the relative ease with which it can be used and reused and because of the superior quality of the alkylate that is produced. It is the usual practice to alkylate an isoparaffin with two different olefins in separate reactors and to pass the individual alkylate streams to separate acid settlers or separation zones. It is also known to alkylate an isoparaffin with two different olefins in separate alkyltaors and pass the individual alkylate streams to a common settler provided with a partition spaced from the top and bottom of the separator, thereby allowing communication between the separate sections of the settler. Also, in this latter system the acid catalyst is combined and returned as a single stream to the respective alkylators. By so operating, additional expense is involved in heat exchange equipment and heat exchange fluids.

In accordance with this invention, alkylates of higher quality are provided by alkylating isoparaffin with different olefins in different reactors by partially mixing the acid recovered from the separate alkylate streams and recycling separate streams of the partially mixed acid to the different alkylation reactors.

Accordingly, an object of this invention is to provide an improved process and apparatus for simultaneously alkylating one or more isoparaffins with at least two different olefins.

Another object of this invention is to provide an improved process for simultaneously and separately alkylating an isoparaffin with two or more olefins to produce a high quality alkylate.

A further object of this invention is to provide an improved process and apparatus which effect improved heat control in the alkylation of one or more isoparaffins with at least two different olefins.

Other objects and aspects, as well as the several advantages of the invention, will become apparent upon consideration of the accompanying disclosure, the drawing, and the appended claims.

SUMMARY OF THE INVENTION

In accordance with the invention, a process is provided which comprises alkylating in separate alkylators an isoparaffin with different olefins at different temperatures, using a liquid acid alklation catalyst, separately recovering the different alkylates from the acid catalyst, partially combining the acid from the different alkylate streams, and recycling separate streams of the partially combined acid to the separate alkylators.

In accordance with one embodiment of the invention, the separate alkylate streams are passed to a common settler provided with a baffle extending from the top into close proximity to the bottom thereof and an outlet in the bottom of the settler provided with a plate so that partial mixing of the acid being returned from the different chambers in the settler are partially mixed, but for the most part are maintained separate, and returned as separate streams to the acid coolers and respective alkylators.

Further, in accordance with the invention, the propylene alkylate separated in one chamber of the settler is passed to a depropanizer wherein propane is taken of overhead, a side stream of isobutane is recycled for reuse in the alkylator, and the bottoms propylene alkylate is passed to a deisobutanizer. The deisobutanizer is also fed by the effluent butylenes alkylate from the other chamber of the separator and isobutane is taken overhead and returned as a partial source of isoparaffin for each of the alkylators. Bottoms streams comprising propylene and butylenes alkylate are recovered from the deisobutanizer as product.

DESCRIPTION OF PREFERRED EMBODIMENTS

The common alkylate-acid settler of the invention comprises in the preferred embodiment a vertical vessel provided with an upright baffle extending from the top wall to substantially the bottom wall, but is spaced from the bottom wall only to allow some communication between the acid phases in the bottom of the two compartments. The alkylate-acid settler is operated liquid full and the baffle is further provided at an intermediate point thereof with apertures and two short vertical plates on each side of the apertures to form an equalizing well between the two liquid-full chambers containing the different alkylates. At the base of the baffle dividing the settler, there is provided a vortex breaker in the form of an inverted cone which comes in close proximity to the bottom of the settler. The bottom outlet of the settler is in the form of a T connected to two different conduits for return of acid to the acid coolers feeding the respective alkylators. The T is further provided with a vertical plate that extends into the vessel and allows some communication between the two chambers so as to allow a partial mixing of acid, but for the most part maintains a division so that acid catalyst is returned for the most part to the respective alkylators from which it was introduced into the separator.

The preferred olefins in the process are propylene and butylenes, but any $C_3$ to $C_7$ olefins can be used. Isobutane is preferred as the isoparaffin, but $C_4$ to $C_8$ isoparaffins can be used. In carrying out the alkylation operation, the alkylatable stream containing the lighter olefin requires a higher temperature to produce the best alkylate and this is an important aspect of the invention with respect to heat utility obtained by partial mixing of the acid from both alkylate-acid streams for separate recycling to the alkylators. The difference in acid temperature permits recycling essentially separate acid streams near the actual temperature required in the respective alkylators which in turn simplifies heat exchange required to operate the dual alkylating units. In other words, if the acids were combined from the two alkylators, a greater amount of heat exchange fluid would be needed to cool the combined stream with a low temperature alkylator which operates at a substantially lower temperature than the high temperature alkylator for the lower olefin.

A better understanding of the invention will be obtained by reference to the accompanying schematic drawing showing an arrangement of apparatus illustrating the preferred embodiment of the invention.

Referring to the drawing, a pair of alkylators 10 and 11 are connected with a settler 12 and acid coolers 13 and 14. The acid coolers are in turn connected to settler 12 by way of lines 15 and 16. Propylene, the lighter olefin which can be in admixture with isoparaffin, such as isobutane, is passed by way of lines 17, 18 and 19 to the inlet end of alkylator 10. Recycle isobutane containing some propane is returned by line 20. Additional recycle isobutane recovered as hereinafter described is introduced into line 19 by way of line 21.

Butylene feed, which can be in admixture with isobutane, is passed by way of line 22 through line 23 and heat exchanger (refrigerated) 23' and into the inlet end of alkylator 11. Recycle isobutane is introduced into line 22 by way of line 24. Recycle acid catalyst cooled in heat exchangers 13 and 14 is introduced into the inlet ends of alkylators 10 and 11, respectively, for mixing with olefin and isoparaffin to form alkylate.

Effluent alkylate together with catalyst is introduced into a lower portion of settler 12 by the outlets of alkylators 10 and 11. Alkylate-acid settler 12 is divided into two compartments by means of baffle 25 which extends from the top of settler 12 into close proximity to the bottom of settler 12. Baffle 25 is provided with a pressure equalizing chamber defined by vertical plates 26 and 27 which are on each side of an area containing apertures 28 in baffle 25. Settler 12 is also provided with plates 29 for effecting separation of alkylate, isoparaffin, and catalyst. The lowermost perforated plate 29 is provided with vertical perforated plates 30 and 31 which assist further separation of hydrocarbon from the more dense acid catalyst and also dissipate the action of the effluent being introduced into settler 12 from alkylators 10 and 11. The effluents from alkylators 10 and 11 are introduced preferably just immediately below lowermost plate 29.

The lower portion of settler divider plate 25 is provided with a vortex breaker 32 which is in the form of an inverted cone. The bottom of settler 12 is provided with an outlet T 33 which has an upright plate 34 extending into settler 12, but does not close off communication between the lower portions of the two chambers formed in settler 12. Thus, acid catalyst descending along the walls and around the vortex breaker are for the most part returned to their respective alkylators; however, some mixing can take place. A major proportion of the acid from the respective chambers is returned by way of lines 15 and 16 to acid coolers 13 and 14.

Propylene alkylate, propane and isobutane are moved from the top of settler 12 by way of line 35 and passed to depropanizer 36 wherein a light stream comprising propane is removed overhead by way of line 37 and passed through condenser 38 and into accumulator 39. The condensate is removed from accumulator 39 by way of line 40 and a portion of it is returned as reflux to the top of column 36 by way of line 41. The remainder of the condensate is passed by way of line 42 to a propane stripper 43 wherein hydrofluoric acid is taken overhead by line 44 and returned to condenser 38 and accumulator 39. Propane is removed as bottoms by way of line 45.

At an intermediate portion of depropanizer 36 a side stream is withdrawn which comprises primarily isobutane along with some propane and is passed by way of line 46 and line 20 for reuse in alkylator 10. This intermediate stream is cooled by cooler 47. A bottoms stream comprising propane-free isobutane, isopentane, and propylene alkylate is removed from depropanizer 36 by way of line 48 and passed to deisobutanizer 49.

A butylene alkylate stream containing unreacted isobutane is removed from settler 12 by way of line 50 and passed to an upper portion of deisobutanizer 49. Isobutane is taken overhead from column 49 by way of line 51, cooled, and passed to surge tank 52 and isobutane is withdrawn from tank 52, as needed, for recycle to alkylators 10 and 11 by way of lines 21 and 24, respectively.

A normal butane product stream is removed near the bottom of column 49 by way of line 53 and a mixed alkylate stream is removed by way of line 54 as product.

An alkylation unit, such as that shown in the drawing, is operated according to the invention by contacting propylene and isobutane with hydrofluoric acid catalyst at a temperature of about 105° F. at the inlet end of alkylator 10 and with about a 20° temperature rise in the reactor. The alkylate from reactor 10 is introduced into settler 12 at a temperature of about 125° F. Butenes and isobutane are contacted with hydrofluoric acid in alkylator 11 at the inlet end at a temperature of about 60° F. and with a 20° F. temperature rise the alkylate is introduced into settler 12 at a temperature of about 80° F. The acid catalyst removed from settler 12 is partially mixed (equalizing the liquid-full systems) such that the acid returned in line 15 is at a temperature of about 120° F. and the acid in line 16 is at about 96° F. The acid in line 15 needs to be cooled to about 105° F., and that in line 16 needs to be refrigerated to about 60° F. The refrigeration in 14 requires an expensive refrigeration system. The cooling in 13 requires less expensive cooling water, but there must be sufficient temperature drive to get efficient indirect heat exchange.

The invention is not dependent upon specific reaction conditions as these are conventional and well known in the art. However, the ratio of isoparaffin to olefin is usually maintained somewhere in the range of 4:1 to 20:1. The ratio of acid to hydrocarbon feed, particularly when utilizing hydrofluoric acid, is maintained at about 4:1, but this may be varied in the range of 0.5:1 to 6:1. The larger volume of acid recycled to the reactors is utilized as a means of temperature control as well as a catalyst. The alkylation temperature can vary from about 50 to 200° F.; however, when alkylating isobutane with butylene, a reaction temperature in the range of about 60 to 95° F. is preferred, and when alkylating isobutane with propylene, a temperature in the range of approximately 100 to 125° F. is preferred.

The invention encompasses the use of different isoparaffins as well as different olefins in the feeds to the alkylators. Thus, isobutane can be fed to one alkylator while isopentane is fed to the other alklator.

The mixing of the two catalysts from propylene alkylation and butylene alkylation is ratioed so that the temperature of the catalyst charged to the propylene section is at least about 10° F. above the reactor inlet temperature of the propylene reactor at the upstream end of the indirect cooling water heat exchanger, in order to secure proper cooling of the catalyst; and the temperature of the catalyst charged to the butylenes section is no more than about 30° F. above the inlet temperature of the butylenes reactor inlet temperature at the upstream end of the indirect cooling water heat exchanger, in order to secure proper cooling of the catalyst, which will minimize the refrigeration requirements for the butylene alkylation section.

SPECIFIC EXAMPLE

Separate alkylations of propylene with isobutane and butylene with isobutane are carried out in accordance with the apparatus set forth in the drawing and wherein like numbers for stream numbers are set forth in the table below which illustrates the effectiveness of obtaining high quality light and heavy alkylates.

The propylene-isobutane and the butylenes-isobutane alkylation processes are operated at pressure to maintain liquid phase. The propylene alkylation reactor is operated at an inlet temperature of 105° F. and an outlet temperature of 125° F.; the butylenes alkylation reactor is operated at an inlet temperature of 60° F. and an outlet temperature of 80° F.

the acid phase in either system for proper perforated tray operation, the system of the invention has a minimum of mixing of acids, which reduces the expensive refrigeration load required in the butylenes alkylation system.

It is further pointed out that combined alkylation produces lower octane than the separate alkylation of propylene and of butylenes.

I claim:

1. In a process for simultaneously and separately alkylating a first stream comprised principally of lighter $C_3$ to $C_7$ olefin and a $C_4$ to $C_8$ isoparaffin and a second stream comprised principally of heavier $C_3$ to $C_7$ olefin and said isoparaffin in which said first stream is passed in admixture with an alkylating acid catalyst to a first alkylator under first alkylating conditions at a higher temperature in the range of 50 to 200° F. to form a first alkylate-acid admixture and in which said second stream is simultaneously passed in admixture with an alkylating acid catalyst through a second alkylator under second alkylating conditions at a lower temperature in said range than said first alkylating conditions to form a second alkylate-acid admixture, and in which said first and said second alkylate-acid admixtures are passed to separate settling zones to separately recover the respective alkylates from said first and said second admixtures, the invention TABLE I
[Separate fractionations of the alkylates, B/D]

| Stream | 17 | 20 | 21 | 19 | 35 | 45 | 48 | 22 | 24 | 23 | 50 | 53+54 | 51 |
|---|---|---|---|---|---|---|---|---|---|---|---|---|---|
| $C_3^-$ | 737 | | | 737 | | | | | | | | | |
| $C_3$ | 3,685 | 4,642 | 81 | 8,408 | 8,531 | 3,889 | | 81 | 1,201 | 1,282 | 1,282 | | 1,282 |
| $iC_4$ | 7,845 | 37,405 | 3,638 | 48,888 | 43,712 | 59 | 6,248 | 2,862 | 53,994 | 56,856 | 51,600 | 216 | 57,632 |
| $nC_4$ | 579 | 1,817 | 364 | 2,760 | 2,760 | | 943 | 1,245 | 5,400 | 6,645 | 6,657 | 1,836 | 5,764 |
| $C_4^-$,s | 2,081 | | | 2,081 | | | | 4,738 | | 4,738 | | | |
| $iC_5$ | 1,607 | 761 | 94 | 2,462 | 3,448 | | 2,687 | 45 | 1,391 | 1,436 | 2,278 | 3,480 | 1,485 |
| $C_5^-$,s | 1,256 | | | 1,256 | | | | 55 | | 55 | | | |
| $nC_6^+$ | 230 | | | 230 | 230 | | 230 | | | | | 230 | |
| Light alkylate | | 88 | 25 | 113 | 5,991 | | 5,901 | | 371 | 371 | 7,125 | 12,630 | 396 |
| Heavy alkylate | | | | | 735 | | 735 | | | 4 | 4 | 843 | 1,574 | 4 |
| Total | 18,020 | 44,713 | 4,202 | 66,935 | 65,405 | 3,958 | 16,744 | 9,026 | 62,361 | 71,387 | 69,785 | 19,966 | 66,563 |

TABLE II
[Combined fractionation of the alkylates, B/D*]

| Stream | Combined 17 | Combined 22 | Recycle iC₄ 20 | Recycle iC₄ 24 | Recycle iC₄ 21 | Total Feed | Combined 35 | Combined 50 | Total effluent | Feed to Col. 36 | Feed to Col. 49 | 45 | 48 | 51 | 53+55 |
|---|---|---|---|---|---|---|---|---|---|---|---|---|---|---|---|
| $C_3^-$ | 737 | | | | | 737 | | | | | | | | | |
| $C_3$ | 3,685 | 81 | 4,761 | 10,460 | 40 | 19,027 | 8,760 | 10,612 | 19,372 | 8,650 | 10,722 | 3,889 | | 10,722 | |
| $iC_4$ | 7,845 | 2,862 | 38,179 | 55,961 | 1,807 | 106,654 | 43,276 | 52,821 | 96,097 | 42,942 | 53,155 | 59 | 4,704 | 57,768 | 91 |
| $nC_4$ | 579 | 1,245 | 3,238 | 5,595 | 181 | 10,838 | 4,877 | 5,961 | 10,838 | 4,840 | 5,998 | | 1,602 | 5,776 | 1,824 |
| $C_4^-$,s | 2,081 | 4,738 | | | | 6,819 | | | | | | | | | |
| $iC_5$ | 1,607 | 45 | 560 | 1,442 | 46 | 3,700 | 2,487 | 3,038 | 5,525 | 2,455 | 3,070 | | 1,895 | 1,488 | 3,477 |
| $C_5^-$,s | 1,256 | 55 | | | | 1,311 | | | | | | | | | |
| $NC_6^+$ | 230 | | | | | 230 | 108 | 122 | 230 | 103 | 127 | | 103 | | 230 |
| Light alkylate | | | 91 | 385 | 12 | 488 | 5,877 | 7,183 | 13,060 | 5,820 | 7,240 | | 5,729 | 397 | 12,572 |
| Heavy alkylate | | | | 4 | | 4 | 710 | 868 | 1,578 | 705 | 873 | | 705 | 4 | 1,574 |
| Total | 18,020 | 9,026 | 46,829 | 73,847 | 2,086 | 149,808 | 66,095 | 80,605 | 146,700 | 65,515 | 81,185 | 3,948 | 14,738 | 76,155 | 19,768 |

* The alkylation effluent is split with substantially the same quantity charged to the depropanizer as in Table I.

Fractionation in accordance with Table II places an additional load on the deisobutanizer 49 because the propane is not segregated as it is in the system of the invention represented by Table I. That is, in the system of Table II, there is a build-up of propane feed amounting to 10,722 barrels per day, as compared with only 1282 barrels per day propane in the feed using the invention's system of Table I. The system of Table I saves about 7,000,000 B.t.u./hr. vaporizing and condensing load, as well as pump load. In each case, the depropanizer is operated in the same manner (to rid the system of charged plus made propane).

It is further stressed that when maintaining the HF acid substantially separate in each zone in accordance with the invention, the acid zones, however, having to be in liquid communication to equalize pressures on the liquid full systems to prevent a raising or lowering of steps which comprise operating said settling zones liquid full, mixing at least a portion of the acid catalyst recovered from each of said first and said second admixtures substantially at the point of withdrawal from the respective settling zones in an amount sufficient to provide two acid return streams in which the first acid return stream is about 10° F. higher than the temperature of the first alkylator and the second acid return stream is no more than 30° F. above the temperature of said second alkylator, and passing said first and said second acid return streams to said first and said second alkylators, respectively, thereby materially reducing the heat exchange requirements in said alkylators.

2. A process according to claim 1 wherein said first stream consists essentially of propylene and isobutane and said second stream consists essentially of butylenes and isobutane, the temperature in said first alkylator is maintained in the range of 110 to 125° F. and the temperature in said second alkylator is maintained in the range of 60 to 95° F. and HF is said acid catalyst.

3. A process according to claim 2 comprising the additional steps of passing the propylene alkylate stream from its settling zone to a depropanizer to recover overhead propane and residual hydrogen fluoride and a side stream comprising isobutane, recycling at least a portion of the isobutane to the first alkylator as a portion of the feed, passing the butylenes alkylate stream from its settling zone along with the bottoms from said depropanizer to a deisobutanizer to recover an overhead stream of isobutane, which is recycled as a portion of the reactants for said alkylators, and separate bottoms streams of butylenes and propylene alkylates as products.

References Cited

UNITED STATES PATENTS

| | | | |
|---|---|---|---|
| 3,080,438 | 3/1963 | Sailors | 260—683.58 |
| 3,113,987 | 12/1963 | Hutson | 260—683.58 |
| 3,158,661 | 11/1964 | Plaster et al. | 260—683.58 |
| 3,169,153 | 2/1965 | Walker et al. | 260—683.48 |
| 3,213,157 | 10/1965 | Hays et al. | 260—683.48 |
| 3,246,047 | 4/1966 | Chapman et al. | 260—683.48 |

DELBERT E. GANTZ, Primary Examiner

G. J. CRASANAKIS, Assistant Examiner

U.S. Cl. X.R.

260—683.48